H. A. MONROE.
PLASTIC BLOCK MAKING APPARATUS.
APPLICATION FILED JULY 6, 1915.

1,258,237.

Patented Mar. 5, 1918.
7 SHEETS—SHEET 5.

H. A. MONROE.
PLASTIC BLOCK MAKING APPARATUS.
APPLICATION FILED JULY 6, 1915.
1,258,237.
Patented Mar. 5, 1918.
7 SHEETS—SHEET 6.
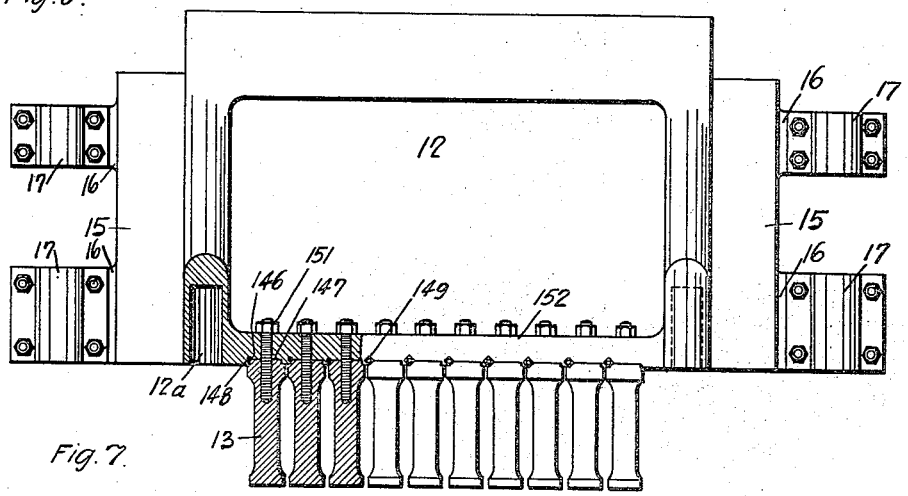
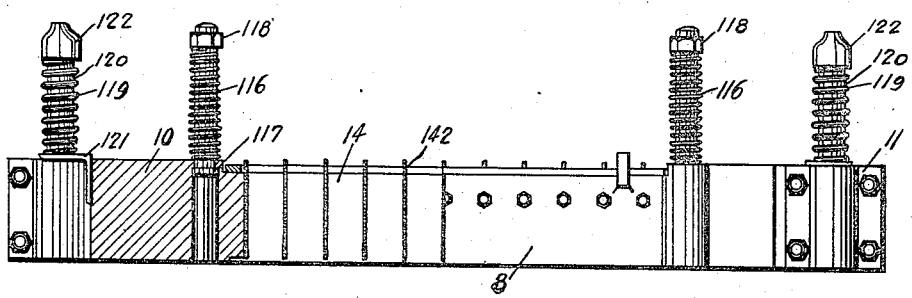
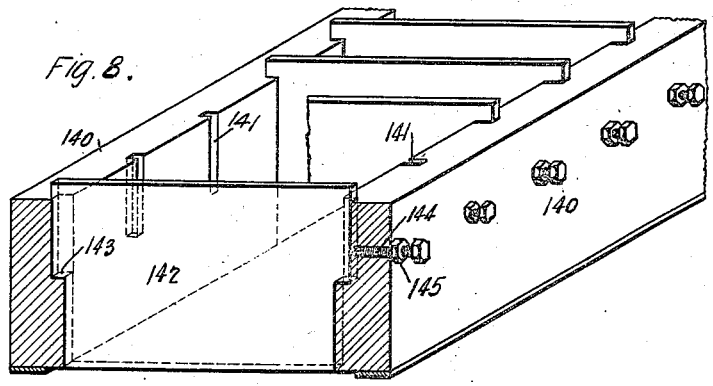

H. A. MONROE.
PLASTIC BLOCK MAKING APPARATUS.
APPLICATION FILED JULY 6, 1915.

1,258,237.

Patented Mar. 5, 1918.
7 SHEETS—SHEET 7.

Witnesses
B. M. Hartman
D. M. Brugger

Inventor
Henry A. Monroe
By
Attorney

UNITED STATES PATENT OFFICE.

HENRY A. MONROE, OF WESTFIELD, NEW YORK, ASSIGNOR OF ONE-HALF TO JAMES H. PRENDERGAST, OF WESTFIELD, NEW YORK.

PLASTIC-BLOCK-MAKING APPARATUS.

1,258,237.    Specification of Letters Patent.    Patented Mar. 5, 1918.

Application filed July 6, 1915.   Serial No. 38,142.

*To all whom it may concern:*

Be it known that I, HENRY A. MONROE, a citizen of the United States, residing at Westfield, in the county of Chautauqua and State of New York, have invented new and useful Improvements in Plastic-Block-Making Apparatus, of which the following is a specification.

This invention relates to plastic block making apparatus and consists in certain improvements in the construction thereof as will be hereinafter fully described and pointed out in the claims.

The object of the invention is to provide a machine for making plastic blocks, particularly cement bricks where it is desirable to give to the plastic material sufficient pressure to firmly unite the elements of the brick and to so condense it as to improve its quality for use.

The invention is illustrated in the accompanying drawings as follows:—

Figure 1:
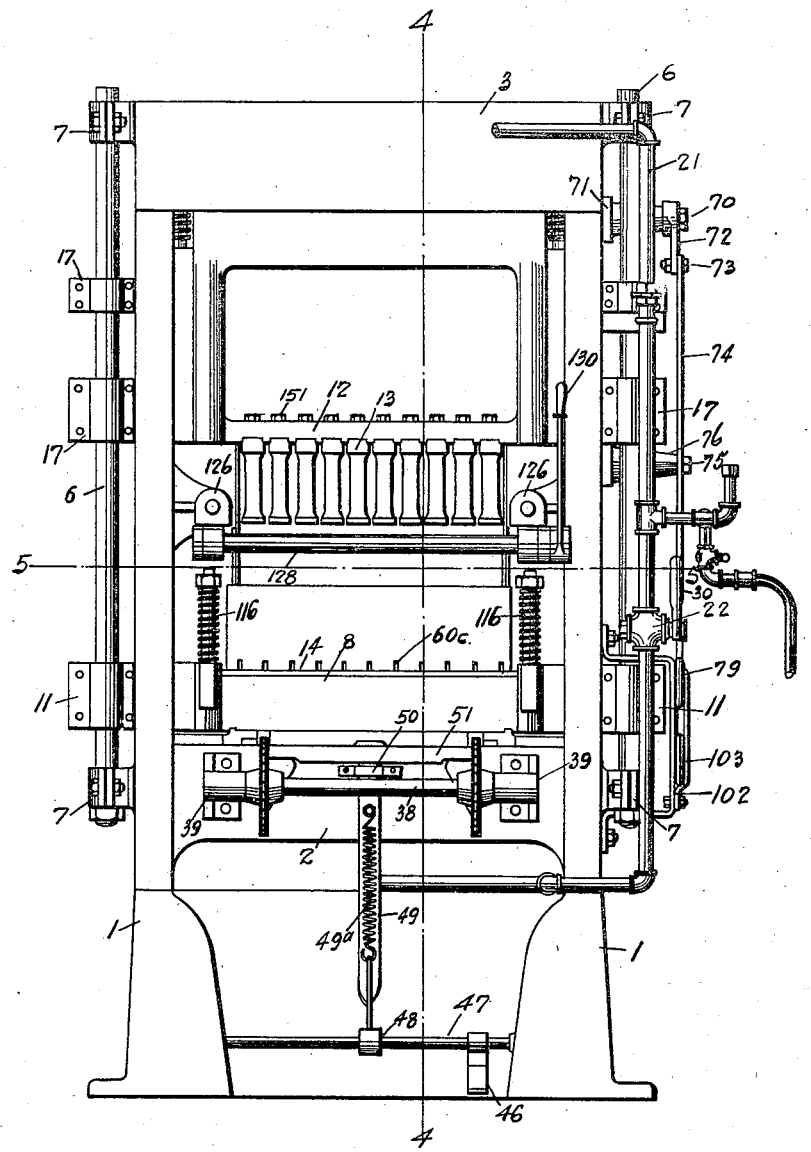

Figure 1 shows a front elevation of the machine.

Figure 2:
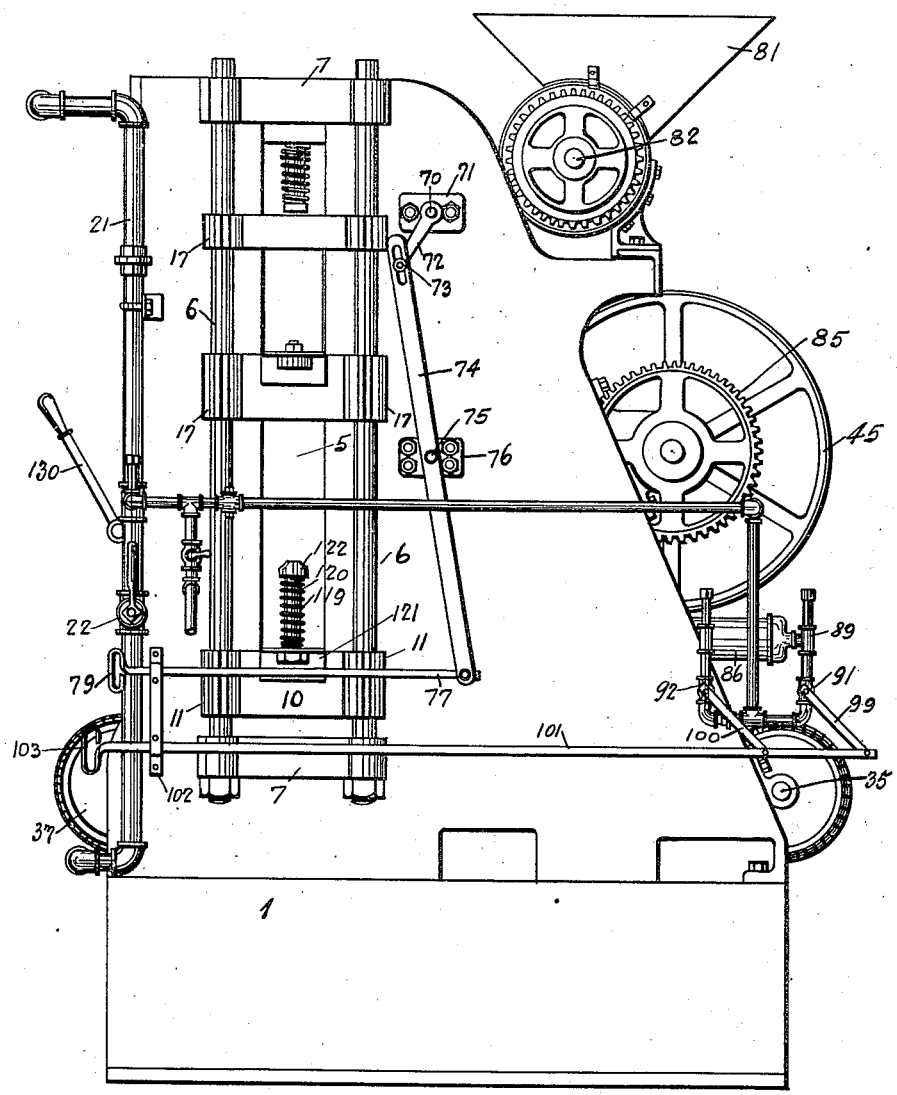

Fig. 2 a side elevation.

Figure 3:
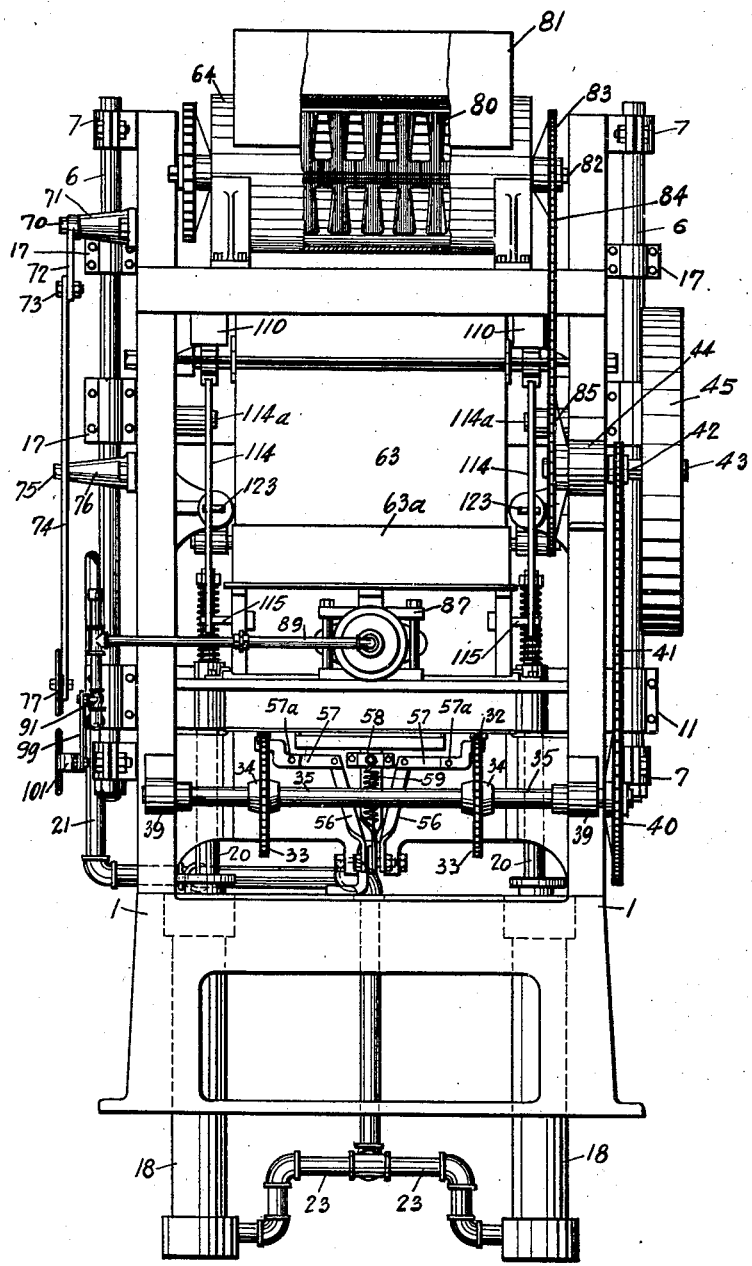

Fig. 3 a rear elevation.

Figure 4:
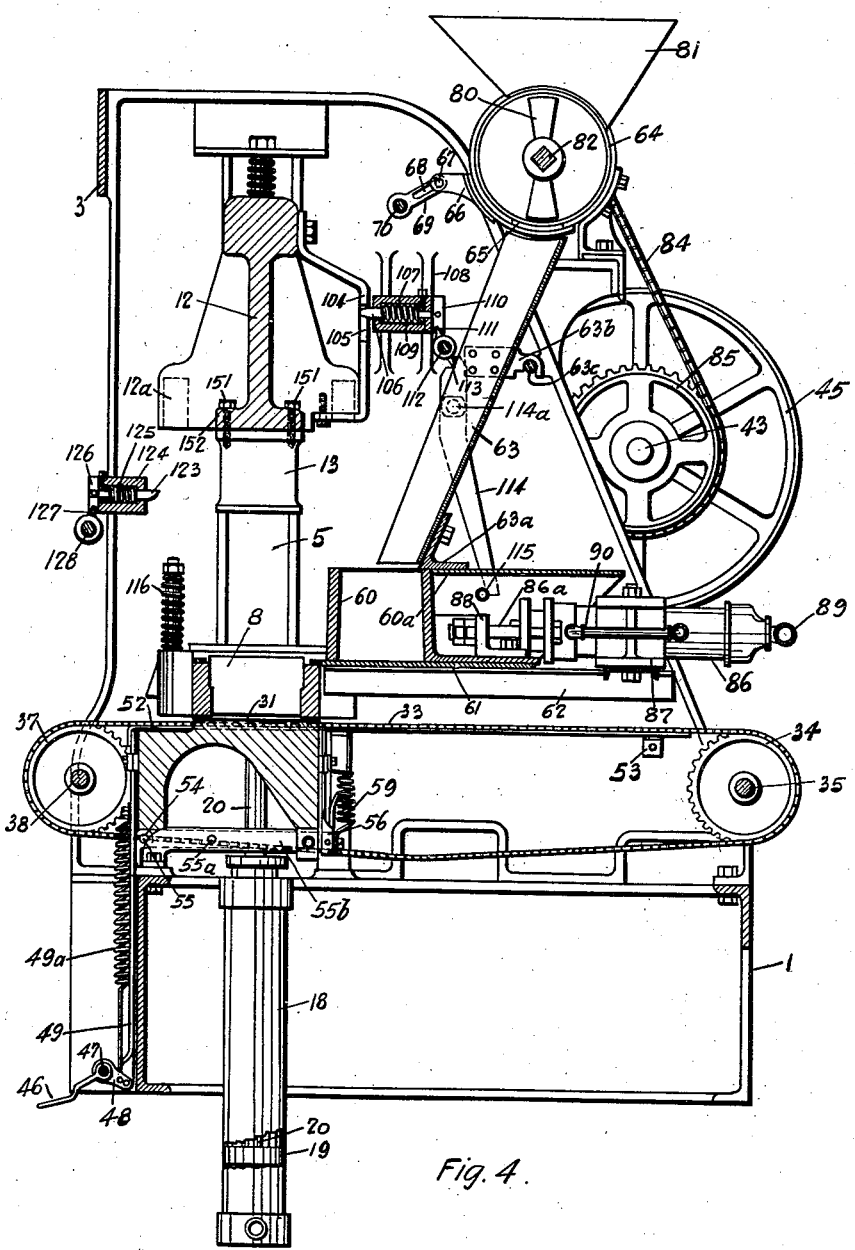

Fig. 4 a section on the line 4—4 in Fig. 1.

Figure 5:
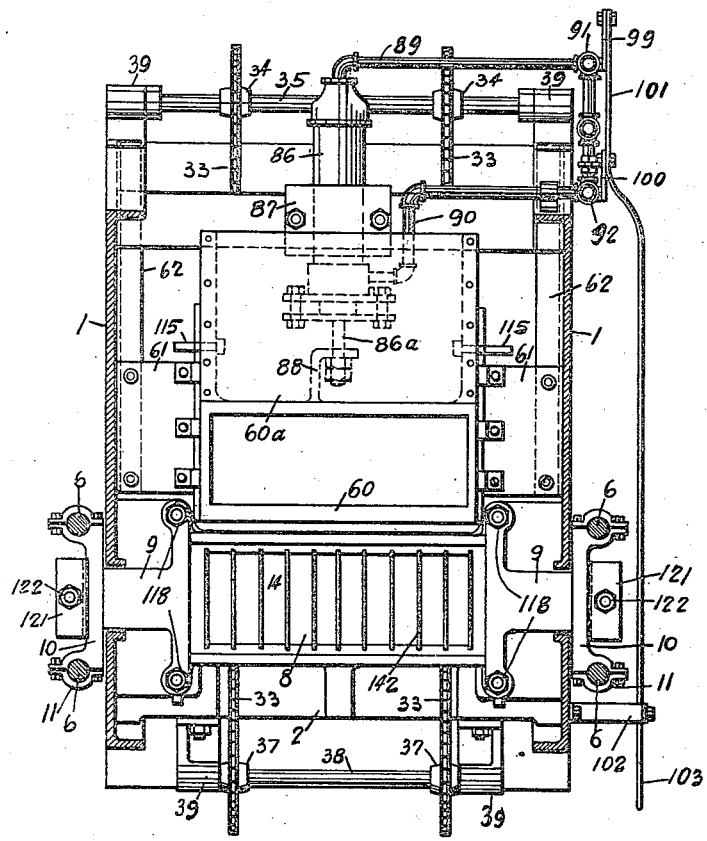

Fig. 5 a section on the line 5—5 in Fig. 1.

Fig. 6 a side elevation, partly in section, of the mold plunger.

Fig. 7 a side elevation, partly in section, of the mold.

Fig. 8 a perspective sectional view of the mold.

Figure 9:
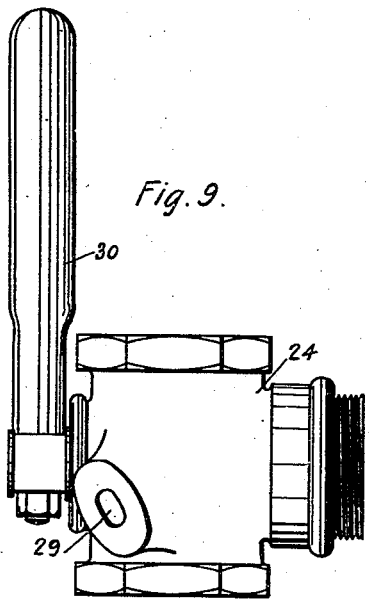

Fig. 9 a side elevation of the controlling valve for the mold lifts.

Figure 10:
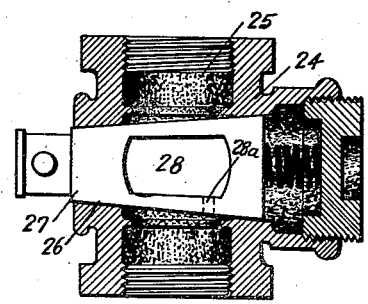

Fig. 10 a central section through said valve.

Figure 11:
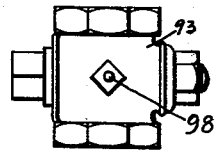

Fig. 11 an elevation of one of the controlling valves for the sand box motor.

Figure 12:
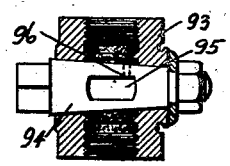

Fig. 12 a central section through the valve shown in Fig. 11.

1 marks the sides of the frame, 2 the mold table forming a cross connection between the sides of the frame and 3 a top plate connecting the sides.

The sides are provided with the vertical slots 5 and at each side of the outer faces of the slots guide rods 6 are mounted, these guide rods being clamped in brackets 7 at their tops and bottoms. The mold box 8 has projections 9 extending through the slots 5. Lateral projections 10 outside the slots terminate in bearings 11, slidingly mounted on the rods 6. In this way the mold box is guided in its movement to and from the mold table. The mold plunger 12 has a series of plunger projections 13 which enter the individual molds 14 in the mold box. In the general operation of the machine, the mold box is filled with sand when on the mold table and the mold plunger permitted to drop thus exerting great pressure on the material in the mold and condensing and forming it. The mold plunger has the projections 15 which extend through the slots 5. Lateral projections 16 are arranged on the outer face of the frame and these terminate in the bearings 17 which are mounted on the rods 6 so that the plunger is thus slidingly mounted on the rods 6.

The mold box after the block is formed is lifted so as to clear it of the plastic material and again lowered for a new molding operation. In the present instance this is accomplished by an air lift which comprises the cylinders 18 having a piston 19 and piston rod 20, the rod being secured at the underside of the mold box. Air is delivered through the pipe 21 and passes the valve 22 and is carried by the lateral pipes 23 from the pipe 21 to the bottoms of the cylinders 18. The controlling valve is shown in detail in Figs. 9 and 10. It comprises the valve body 24 with the way 25 through the valve. A plug opening 26 is provided in which is arranged the valve plug 27. The valve plug has an opening 28 in which there is a waste way 28ª. A waste way 29 extends through the body. When the valve is turned so as to bring the way 28 in register with the way 27 air is turned under the pistons 19 and the mold box is thus forced upwardly. The valve is then swung so as to bring the way 28 in register with the way 29 so as to exhaust the air from the cylinders. The way 28ª forms a restricted passage so that on the downward movement of the mold box the air in the cylinders acts as a cushion and the restricted release acting as a dash pot prevents undue jar. An operating handle 30 is arranged on the plug 27 by which the valve may be readily operated.

A platen 31 is arranged under the mold box and in the molding operation forms the bottom of the box. The convenient and rapid handling of this platen especially in carrying away the formed bricks is one of the objects of this invention. Grooves 32 are arranged in the face of the mold table and endless chains or carriers 33 extend through these grooves. The chains extend around the sprockets 34 at the rear of the machine, these sprockets being carried by the shaft 35. The shaft 35 is journaled in the bearings 39 on the frame. The front end of the carrier passes over the sprockets 37. These are fixed on the shaft 38. The shaft 38 is journaled in bearings 39 extending from the front of the frame. A sprocket 40 is fixed on the end of the shaft 35 and the sprocket chain 41 extends through the sprocket 40 to a sprocket 42. The sprocket 42 is fixed on the shaft 43. The shaft 43 is journaled in a bearing 44 on the side frame and carries the drive pulley 45 to which power is applied. It will, therefore, be seen that the carrier 33 is continuously rotated.

The carrier is normally below the lower face of the platen. When it is desired to carry the platen out of the machine with its load of formed bricks, the carrier is elevated into engagement with the platen and this carries the platen to the rear of the machine where it is received by an attendant. Thus the attendant in removing the bricks in no way interferes with the operator handling the machine. The detail mechanism for accomplishing this is as follows:—A foot lever 46 is fixed on a rod 47 extending from the side frame. A rock arm 48 is fixed on the rod 47 and a rod 49 extends upwardly from the rock arm 48. The upper end of the rod 49 is guided by a strap 50. A cross piece 51 is secured to the upper end of the rod 49 and extends under a longitudinal bar 52, extending under the carrier chain 33 and terminating at the rear of the machine being supported at the rear by a bracket 53 secured to the frame sides. A spring 49ª is secured to the rod 49 and to the rock arm 48 nearer the pivot than the bar 49 so that the spring tends to depress the arm 48 and to raise the foot lever 46. A lever 54 is pivoted to the rod 49 by means of a pin 55. The lever 54 is pivoted on a pin 55ª carried by an arm 55ᵇ extending between the front and rear of the molding table. The rear ends of the lever 54 are connected by links 56 with the levers 57. The levers 57 are fulcrumed on pivot pins 57ª secured to the rear of the molding table. The outer ends of the levers 57 extend under the bars 52 and thus assist in lifting these bars so as to carry the chains into engagement with the platen 31. A spring 59 is secured to the rear end of the lever 54 and assists in returning the parts to normal. A drop rod 58 forms a guide for the rear end of the lever 54 as well as limiting the upward movement. It will be readily seen that as the foot lever 46 is depressed the two bars 52 under the chain 33 are elevated thus lifting the carriers 33 into engagement with the platen. The bar 52 does not, however, interfere with the chains moving over them when in this elevated position.

A sand box 60 is arranged to the rear of the mold box 8. It is carried on a board 61, the board being mounted on a bracket 62 secured to the sides of the frame. A chute 63 delivers the material to the sand box. The bottom of the chute rests against a cross piece 63ª extending from one side of the frame to the other. A hook bracket 63ᵇ is secured to the upper part of the chute and hooks over a rod 63ᶜ extending between the sides. In this way the chute can be readily removed by simply unhooking the bracket hooks 63ᵇ.

Material is delivered to the chute from the mixer 64. The mixer is provided with a gate 65 at its bottom, the gate having arms 66. The arms have the pins 67 which extend into slots 68 in rock arms 69. The rock arms 69 are fixed on the rods 70. The rods 70 extend through the side frame and are carried in bearings 71 on the frame sides. An arm 72 is fixed on the shaft 70 and has a pin 73 extending through a slot in the end of the lever 74. The lever 74 is pivoted on a pin 75 carried by a bracket 76 on the frame side. A link 77 extends from the lower end of the lever 74 and terminates in a handle 79 at the front of the machine in convenient position for the operator to actuate it. The operator by pulling the handle 79 forward opens the gate, delivers to the chute a charge of mixed material and this is carried by the chute to the sand box and from the sand box over to the mold. The mixer has the mixer arms 80 with the usual hopper 81. The arms 80 are carried by the shaft 82. A sprocket 83 is fixed on this shaft and a chain 84 leads from the sprocket 83 to a sprocket 85 on the shaft 43. In this way the mixer arms are continuously rotated.

The sand box is actuated by an air motor. This comprises a cylinder 86 which is carried by the cross frame 87. The piston rod 86ª of the motor extends from the piston (not shown) in the cylinder to a bracket 88 on the rear of the sand box so that the sand box moves with the piston. Pipes 89 and 90 lead to the opposite ends of the cylinders and valves 91 and 92 control the pipes 89 and 90 respectively. A detail of these valves is shown in Figs. 11 and 12. Each comprises a body 93, a valve plug 94 having a way 95 therethrough and the waste way 96 adapted to be brought into register with the waste opening 98. The valve plugs are provided with the lever handles 99 and 100 and these are connected with a controlling rod 101 extending to the front of the machine, the front end of the rod being slidingly supported by a bracket 102 and provided with a handle 103. The valve ways are also arranged relatively to the levers 99 and 100 so that as one is opened to the air turning the air into one end of the cylinder the opposite valve is closed against delivering air to the cylinder and has the waste 98 open so that when one end of the cylinder takes air the opposite end exhausts. The operator having delivered a charge of sand to the sand box moves the handle 103 turning air into the pipe 89 and the sand box is carried forward over the mold and delivers a charge to the mold. Reversing the valves by action of the handle 103 returns the sand box, the box stripping the surplus material from the top of the mold.

The mold plunger 12 is locked in its upper position and released therefrom by the following mechanism: Brackets 104 are secured to the rear of the plunger frame. These brackets have catch slots 105 into which the catches 106 extend. The catches are mounted in a spring case 107 carried by the projections 108 on the side frames. Springs 109 are arranged in the spring case and force the catches forward. A shoulder or collar 110 is carried at the rear end of the catches and these have notches or engaging fingers 111, the fingers being mounted on a rod 112 extending across the frame. Fingers 113 extend from the opposite sides of the rods 112 and engage releasing levers 114. These levers are journaled on pins 114$^a$ on the side frame and are in the path of pins 115 on the rearward extension 60$^a$ of the sand box.

The operation of this releasing mechanism is as follows:—When the sand box goes forward, the lower end of the lever 114 swings forward, the pins passing under the ends. On the return of the sand box the pins 115 strike the lever 114 and the movement of the lever is sufficient to swing the levers 114 to actuate the fingers 113 and 111 to withdraw the catches 105 so as to release the mold plunger. The pins 115 passing the ends of the levers permit them to swing forward to permit the catches to return to operative position.

Upon the release of the mold plunger, it descends driving the projections 13 into the individual molds compressing the material therein.

The mold plunger is lifted with the mold box but it is desirable to have the mold plunger remain in its lower position through the initial movement of the mold box so as to strip the molded material from the mold box. The mold box is provided with the springs 116 which are arranged around headed bolts 117, the heads being carried within the mold box as clearly shown in Fig. 7. The upper end of the headed bolt has a nut 118 holding the springs in place. As the mold box is lifted the rods 117 pass into a socket 12$^a$ in the mold plunger, thus yieldingly engaging the same and allowing the box to have an initial movement to strip the formed bricks from the mold. I prefer to supplement the springs 116 by springs 119. These are carried by headed rods 120 which are telescopically mounted in brackets 121 on the projections 15. The rods have the heads 122 at their upper ends which engage the plunger. These operate in substantially the same way as the springs 116.

In order to catch the mold box and hold it in its upper position, I provide the latch or catch 123. The catch 123 is mounted in a spring case 124 and is yieldingly forced forward by the spring 125. The catch rod has a shoulder 126 which is engaged by a rock finger 127. The rock finger is fixed on a shaft 128 and a handle 130 is provided for actuating the rod. It will be understood that one of the latches 123 is arranged at each side of the frame so as to engage opposite ends of the mold box as clearly shown in Fig. 4. After the discharge of the formed bricks on the carrier 33, the operator operates the handle 130 releasing the mold box. The mold box passes downwardly without jar by reason of the restricted opening 28$^a$ in the controlling valve 22.

The mold box is formed with the sides 140. These are provided with vertical slots 141 which extend only part way through the sides. Division plates or partition plates 142 have the projections 143 which extend into these slots. Set screws 144 extend through the sides against the edges of the division plates and lock them in place. Jam nuts 145 are provided for locking the screws in place. The division plates preferably extend slightly above the sides thus yielding to any slight inaccuracy of the plunger projections.

The plunger has a series of grooves 146 in its lower face and the plunger projections 13 have shoulders 147 fitting into these grooves. The shoulders and grooves are cut away forming an opening 148 from side to side of the grooves and bolts 149 extend through the opening 148 being provided with nuts on the end thus locking the projections against side movement on the face of the plunger. The projections are vertically drawn into the grooves by means of screws 151 which extend through the bottom bar 152 of the plunger into the projections. The plunger is formed with the bottom bar 152 making an opening 153 through the plunger so that access may be readily had to the screws 51.

In the operation of the device, starting with the mold box on the catch 123, the platen is placed on the mold table. The handle 130 is operated releasing the mold box and it descends gently by reason of the restricted opening 28$^a$ in the valve 22. As soon as the mold box is on the mold table, simultaneously with the operation of the lever 130, the handle 79 is operated allowing a charge of sand to be delivered to the sand box. As soon as the mold box reaches the position on the mold table, the handle 103 is operated turning air into the rear of the cylinder 86 forcing the sand box forward to deliver a charge of material. The handle 103 is then returned to its normal position, air turned into the front of the cylinder 86 and exhausted from the rear. This returns the sand box stripping the excess sand from the mold. On the return movement the lever 114 is struck with sufficient violence and moved sufficiently to actuate the fingers 111 and 113 to retract the catch 105 thus permitting the mold plunger to descend. The operator then actuates the controlling valve 22 by means of the handle 30 turning the air into the cylinders 18. This lifts the mold box, the springs 116 and 119 yielding with the initial movement of the mold box so as to strip the bricks from the mold. On the continued upward movement of the mold box, the plunger is carried upwardly with it, the plunger being carried upwardly far enough to be engaged by the catch 105 and the mold box by the catch 103. With the parts in this position the carrier 33 is elevated so as to engage the platen 31 and the platen is carried by the carrier 33 to the rear of the machine where it is taken by an attendant. A new platen is put in place by the machine operator and the cycle above described is repeated. The air lift in connection with the mold box and plunger especially with relation to the stripping action of the plunger is very much less apt to injure the form than devices operating with more jar. With the air lift, therefore, perfect forms are assured with each operation of the machine. The air lift is also advantageous in view of the material being used, the sand and material on which the machine operates making mechanically operated devices difficult to keep in order.

By making the partition plates extend slightly above the face of the mold box and providing the sand box with slots to fit over these upper edges of the partition plates a level of sand is presented to the plunger somewhat below the upper ends of these partition plates. As a result of this no sand is left on the partition plates which may fall on the formed bricks on the removal of the plunger. This also allows the more ready entrance of the plungers into the individual molds. The slots 60$^c$ in the front face of the sand box are clearly shown in Fig. 4.

It will be noted that the extension 60$^a$ on the mold box operating with the bracket 63$^a$ prevents the depositing of sand or material on any of the working parts while the mold box is in its forward position. Any deposits from the chute with the mold box in its forward position will be carried off the rearward projections 60$^a$ by the bracket 63$^a$ as the mold box is returned and will be deposited in the mold box.

What I claim as new is:—

1. In a plastic block making apparatus, the combination of a frame; a mold table thereon adapted to receive a removable platen; an endless carrier below the platen and normally out of engagement therewith; and means for changing the vertical relation between the platen and carrier to bring the carrier into engagement with the platen to convey the platen from the machine.

2. In a plastic block making apparatus, the combination of a frame; a mold table thereon adapted to receive a removable platen; an endless carrier below the platen and normally out of engagement therewith; and means for elevating the carrier into engagement with the platen to convey the platen from the machine.

3. In a plastic block making apparatus, the combination of a frame; a mold table thereon adapted to receive a removable platen; an endless carrier below the platen for conveying the platen; a bar under the carrier and adapted to elevate the carrier into engagement with the platen; and means for actuating the bar.

In testimony whereof I have hereunto set my hand in the presence of two subscribing witnesses.

HENRY A. MONROE.

Witnesses:
B. M. HARTMAN,
THOMAS C. MILLER.